US011542169B2

(12) United States Patent
Ruiz et al.

(10) Patent No.: US 11,542,169 B2
(45) Date of Patent: Jan. 3, 2023

(54) METHOD FOR CONTINUOUS AEROGEL PRODUCTION

(71) Applicant: KEEY AEROGEL, Schlierbach (FR)

(72) Inventors: Francisco Ruiz, Basel (CH); Jean-Yves Clavier, Paris (FR)

(73) Assignee: KEEY AEROGEL, Schlierbach (FR)

( * ) Notice: Subject to any disclaimer, the term of this patent is extended or adjusted under 35 U.S.C. 154(b) by 315 days.

(21) Appl. No.: 16/314,850

(22) PCT Filed: Jul. 3, 2017

(86) PCT No.: PCT/FR2017/051802
§ 371 (c)(1),
(2) Date: Jan. 2, 2019

(87) PCT Pub. No.: WO2018/007740
PCT Pub. Date: Jan. 11, 2018

(65) Prior Publication Data
US 2019/0225498 A1    Jul. 25, 2019

(30) Foreign Application Priority Data
Jul. 4, 2016    (FR) ...................................... 1670366

(51) Int. Cl.
*C01B 33/158*    (2006.01)
*B01J 2/08*    (2006.01)
*B01J 13/00*    (2006.01)

(52) U.S. Cl.
CPC ............. *C01B 33/1585* (2013.01); *B01J 2/08* (2013.01); *B01J 13/0091* (2013.01)

(58) Field of Classification Search
CPC ..... B01J 13/0091; B01J 2/08; C01B 33/1585; Y02P 20/54
See application file for complete search history.

(56) References Cited

U.S. PATENT DOCUMENTS 6,387,341 B1    5/2002    Sarrade et al.
6,516,537 B1    2/2003    Teich et al.
(Continued)

FOREIGN PATENT DOCUMENTS

CN    103130231 A    6/2013
EP    1757559 A1    2/2007
(Continued)

OTHER PUBLICATIONS

Blaszczyriski, T. et al., "Synthesis of Silica Aerogel by Supercritical Drying Method", 11th International Conference on Modern Building Materials, Structures and Techniques, MBMST 2013, Procedia Engineering, 57: 200-206.
(Continued)

*Primary Examiner* — Andrew J. Oyer
(74) *Attorney, Agent, or Firm* — Elmore Patent Law Group, P.C.; Joseph C. Zucchero; Carolyn S. Elmore

(57) ABSTRACT

This invention concerns a method for the manufacture of a granulated aerogel (1) from a precursor (2), comprising the following steps: mixing the precursor (2) with a synthetic solvent (3) and a hydrolysis agent such as water, and if appropriate a catalyst (4), to obtain a gel, granulating the resulting product, in particular by cutting a jet of said gel, to produce granules, maintaining the granules in contact with the synthetic solvent (3) and the hydrolysis agent, washing the granules by adding a washing solvent to extract in particular the hydrolysis agent and, if appropriate, the catalyst (4), drying of the granules to extract the synthetic solvents (3) and/or washing solvents by sending them supercritical $CO_2$ in excess, the steps of granulating, maintaining, washing and drying being carried out at a pressure higher than that of the critical point of $CO_2$, and these conditions being maintained between these steps. The present invention (Continued)

also concerns an installation specially configured to implement the method according to the invention.

20 Claims, 1 Drawing Sheet

(56) References Cited

U.S. PATENT DOCUMENTS

| | | | |
|---|---|---|---|
| 8,217,087 B1* | 7/2012 | Keller | C08J 9/33 |
| | | | 516/104 |
| 2014/0323589 A1* | 10/2014 | Lazar | C01B 33/145 |
| | | | 514/770 |
| 2016/0258153 A1* | 9/2016 | Koebel | C01B 33/145 |
| 2019/0225498 A1* | 7/2019 | Ruiz | B01J 13/0091 |

FOREIGN PATENT DOCUMENTS

| | | | |
|---|---|---|---|
| JP | 2002505940 A | 2/2002 | |
| JP | 2007198786 A | 8/2007 | |
| WO | 9620822 A1 | 7/1996 | |
| WO | 2004060633 A1 | 7/2004 | |
| WO | WO-2006016981 A2 * | 2/2006 | ........... A61K 9/1688 |
| WO | 2016079040 A1 | 5/2016 | |

OTHER PUBLICATIONS

Moner-Girona, M. et al., "Sol-Gel Route to Direct Formation of Silica Aerogel Microparticles Using Supercritical Solvents", Journal of Sol-Gel Science and Technology, vol. 26, https://doi.org/10.1023/A:1020748727348, 2003, 654-649.

Woignier, T. et al., "Aerogel Processing", Handbook of Sol-Gel Science and Technology: Processing, Characterization and Applications, https://hal-amu.archives-ouvertes.fr/hal-01930044, 2018, 985-1011.

Zhang, X. et al., "Applications of supercritical carbon dioxide in materials processing and synthesis", RSC Advances, 105, https://doi.org/10.1039/C4RA10662H, Nov. 10, 2014, 61137-31152.

* cited by examiner

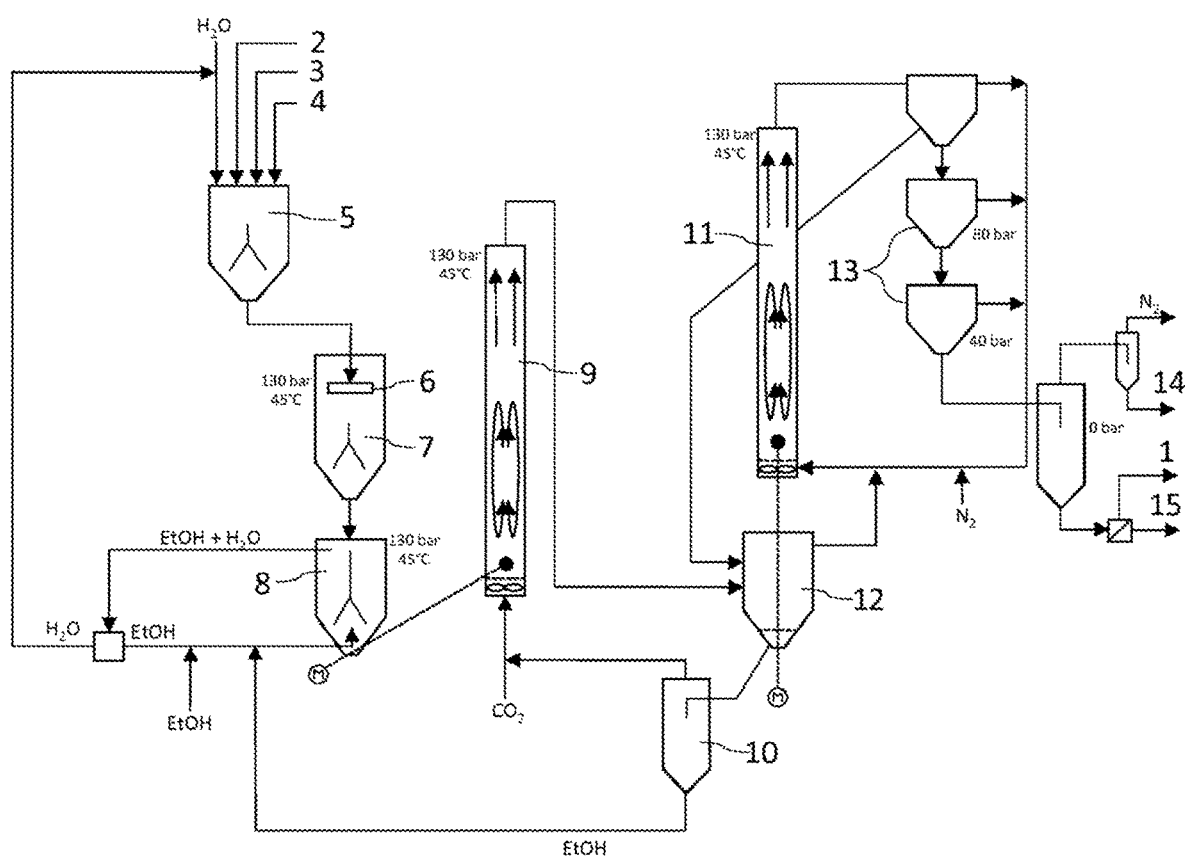

METHOD FOR CONTINUOUS AEROGEL PRODUCTION

The present invention is in the field of materials. It concerns in particular a continuous method for manufacturing an aerogel.

Aerogel is a solid material whose structure consists of a porous matrix in which a majority of pores have a diameter between 2 and 50 nm (mesopores). Thanks to this, it is possible to obtain exceptional properties, such as high porosity (~95%), high specific surface area (up to 1000 $m^2/g$), low thermal conductivity (~0.01 W/m·K), low refractive index (~1.05), and high optical transmission (90%). It is for example very efficient as a thermal insulator. Aerogel production is based on the transformation of a colloidal molecular solution or similar into a cross-linked gel. Depending on the nature of the precursors, aerogels can be inorganic (e.g. silicon oxide, zirconium or titanium-based precursors), organic (e.g. resorcinol-formaldehyde, polyurethane or cellulose polymers) or hybrid (obtained from organo-mineral precursors or by combination).

Aerogel is obtained by replacing the liquid part of a gel with gas during a drying step. This transformation requires very heavy method and installation, and therefore a high production cost. Indeed, in order to produce a quality aerogel, the drying step must be carried out without generating a biphasic system with its associated capillary forces, which would cause the partial or total destruction of the gel's nanostructure. Therefore, it must take place in a supercritical drying (SCD) environment, at high temperature and pressure. This is not suitable for efficient industrial production, particularly because the product is introduced into the supercritical drying module in batches. In order to produce industrial quantities of aerogel at a reasonable cost, the drying step can be carried out at ambient pressure (APD, Ambient Pressure Drying), but because of the evaporation of the solvent, the quality of the product is then compromised, and this causes other difficulties related to the necessary chemical modification of the product. In addition, the production of aerogel from a precursor requiring different steps, they are often carried out individually, and sometimes by different actors, in different locations, which further increases production times and costs, as well as the risks induced by changes of state on the final quality of the product. U.S. Pat. No. 6,670,402B1 proposes an accelerated method for the production of aerogel, through the injection of supercritical $CO_2$ during the drying step, the sending of pressure waves, and the use of a non-reactive and non-condensable gas (NRNC) during depressurization. However, the method described uses an extractor, which operates in batch mode discontinuously.

The purpose of this invention is to compensate at least in part for these disadvantages. To this end, it proposes a method for manufacturing a granulated aerogel from a precursor, comprising the following steps:
- mixing the precursor with a synthetic solvent and a hydrolysis agent, such as water, and if appropriate a catalyst, to obtain a gel,
- granulating the resulting product, in particular by cutting a jet of said gel, to produce granules,
- maintaining the granules in contact with the synthetic solvent and the hydrolysis agent,
- washing the granules by adding a washing solvent to extract in particular the hydrolysis agent and, if appropriate, the catalyst,
- drying the granules in order to extract the synthetic and/or washing solvents by sending supercritical $CO_2$ in excess, This process is particular in that the granulating, maintaining, washing and drying steps are carried out at a pressure higher than that of the critical point of $CO_2$, and these conditions are maintained between these steps.

Thanks to these provisions, the aerogel manufacturing method can be carried out continuously, the pressure increase can be done at a stage where the products are still fluids. Indeed, as soon as the products are solid (as soon as they have been granulated), a pressure increase can no longer be carried out continuously. Thanks to the invention, the products do not require any pressure build-up once they are solid, nor depressurization, except the final depressurization. This significantly reduces manufacturing time and costs, and improves product quality by reducing risky state change and depressurization steps.

According to other characteristics:
- the mixing step can also be carried out at a pressure higher than that of the critical point of $CO_2$, which allows a slight acceleration of this step,
- during the drying step, the solvent-loaded granules can be subjected to a supercritical $CO_2$ jet so as to put them under fluidized bed conditions, under conditions of temperature and pressure such that the $CO_2$ is supercritical, and that the solvent-loaded particles are heavier than the $CO_2$-loaded particles, thus allowing the continuous drying step to be performed and the drying step to be accelerated,
- the synthesis and/or washing solvent may be an organic solvent and the drying step may be carried out under a pressure of between 100 and 200 bar and a temperature of between 35 and 50° C., ethanol being a cheap and suitable product for the process, and conditions between 100 and 200 bar and 35 and 50° C. allowing that at certain rates of $CO_2$ injection into the fluidized bed, particles containing ethanol do not fly away, while those containing only supercritical $CO_2$ fly away from the top of the tower, and can be recovered for further processing,
- the aerogel manufacturing method may include, after the drying step, a step of replacing supercritical $CO_2$ with an inert gas, preferably nitrogen, and then a decompression step, preferably incremental, this additional step allowing rapid decompression without damaging the aerogel granules,
- during the step of replacing supercritical $CO_2$ with an inert gas, the supercritical $CO_2$-loaded granules can be subjected to a jet of said inert gas, so as to put them under fluidized bed conditions, under conditions of temperature and pressure such that the $CO_2$ is supercritical, and that the supercritical $CO_2$-loaded particles are heavier than the particles loaded with inert gas, thus allowing the step of replacing the supercritical $CO_2$ with an inert gas to be performed continuously and to accelerate this step.

The present invention also concerns an installation for the manufacturing a granulated aerogel from a precursor, comprising:
- a mixing reactor,
- a granulation device, capable of forming granules from a jet of gelled liquid from the mixing reactor, if appropriate located inside the aging reactor,
- an aging reactor,
- a washing reactor,
- a drying device, a decompression device.

This installation is particular in that the aging reactor, the washing reactor and the drying reactor, as well as the means for transferring products between these reactors, are configured to operate and allow said products to be maintained from one reactor to another at a pressure higher that that of the critical point of $CO_2$.

Thanks to these provisions, the installation makes it possible to produce aerogel granules continuously, the pressure increase being possible at a stage where the products are still fluids.

According to other characteristics:
- the mixing reactor can also be configured to operate and allow said products to be maintained from one reactor to another at a pressure higher than that of the critical point of $CO_2$; in particular, this further reduces the reaction time,
- the installation can also comprise a first fluidized bed tower configured to be able to replace the solvent contained in the granules with supercritical $CO_2$, thus allowing continuous drying of the granules and accelerating the drying step,
- the installation can also comprise a second fluidized bed tower configured to replace the supercritical $CO_2$ contained in the granules with a pressurized inert gas, preferably nitrogen, for rapid decompression without damaging the aerogel granules.

This invention will be better understood when reading the following detailed description, with reference to the attached FIGURES in which:

FIG. 1 is a diagram illustrating an installation capable of carrying out the method according to the invention.

The method according to the invention consists in the production of an aerogel 1 in a continuous manner. In order to do this, all steps of manufacturing the aerogel 1 take place under a pressure higher than that of the critical point of $CO_2$ required for the drying step, from the granulating step, from which the aerogel becomes solid, to the drying step. The production of the precursor, if included in the method, can also be carried out at a pressure higher than that of the critical point of $CO_2$. The mixing step may or may not be carried out at a pressure higher than that of the critical point of $CO_2$. The critical point of $CO_2$ is located at a temperature of about 31° C., and a pressure of about 73 bar. As the raw materials of aerogel production are liquid, they can be pressurized in a continuous manner, for example by means of a pump. This avoids the need of pressurizing the gel (solids) during the drying stage, which can only be performed in batches (batch process).

The raw material used to produce aerogel 1 is the precursor. For the production of a silica aerogel 1, the precursor can be produced from a silica-rich source such as sand. It may be an alkoxysilane, and more particularly TMOS (tetramethyl orthosilicate) or TEOS (tetraethyl orthosilicate), which may be preferred because methanol and ethanol are by-products of their respective reactions; or from an aqueous siliceous acid and its oligomers (polysiliceous acids), also called sodium silicates. Other types of precursors can be used without going beyond the scope of the invention, for example, to produce carbon, alumina, metal oxide aerogels 1 or organic precursors such as cellulose, polyurethane or products derived from them. The following description refers to the production of silica aerogel 1, but it is easy for the person skilled in the art to transpose these methods to the production of other types of aerogel 1.

The method according to the invention may include the production of a precursor 2, in which case the products necessary for the production of precursor 2 are introduced using a pump.

Precursor 2 can also be produced outside the method, in which case precursor 2 is introduced before being mixed.

Precursor 2 is then mixed with a hydrolyzing agent such as water, a synthetic solvent 3 such as ethanol, for example 95% ethanol, methanol or acetone, and if appropriate a catalyst 4. This mixing is carried out in a mixing reactor 5. Two reactions occur: hydrolysis and condensation. Hydrolysis is caused by the presence of the hydrolyzing agent, and makes it possible to form, from precursor 2, for example silicon dioxide. The silicon dioxide forms a colloidal solution with the synthetic solvent 3. The condensation consists of the agglomeration of colloidal particles in a continuous three-dimensional network, called a gel; we therefore speak of gelation. The relative rates of condensation and hydrolysis reactions can be controlled by the introduction of catalyst 4. The type of catalyst 4 chosen, and more precisely its pH, influences the type of network produced by condensation, and therefore the type of aerogel 1 as final product. Ammonia, for example, can be chosen as a basic catalyst 4. Hydrolysis and condensation reactions can take place simultaneously, by mixing all the products, or successively, by preparing intermediate solutions and then mixing these intermediate solutions together; these are referred to as one-step or two-step synthesis.

After mixing, the granulation stage takes place. The gel, when its viscosity has increased sufficiently, is cut to obtain granules. This is achieved by a granulation device 6, such as a jet cutter, or by another solution known to the skilled person in the art, such as a drip or spray. The type of granulation device 6 can have an influence on the granulometry of the granules obtained, the jet cutter producing in particular bigger granules, typically above 50 microns and up to the millimetre or even above, and the spray finer granules, up to dimensions of about 5 microns or even less; such fine granules are sometimes also called powder, but they will also be called granules in the scope of the present invention.

In this invention, the mixing step may or may not be performed at a pressure higher than that of the critical point of $CO_2$, but the granulation step must be performed at a pressure higher than that of the critical point of $CO_2$. This does not prevent them from running smoothly, and tends to slightly accelerate this operation. High pressure granulation is known to the person skilled in the art, it does not pose any particular problem.

The next step after granulation is the ageing step. After the gel is formed, there are still a large number of particles that have not yet completed their reaction. The aging step may, for example, consist of a long maceration of the gel in a solution in an aging reactor 7 which may contain the same solvent, hydrolyzing agent and catalyst as during the synthesis. After the aging step, substantially all the particles have reacted, all the connections between molecules are finalized and the gel is then more solid. The type of structure thus obtained varies according to different parameters such as time, pH of the solution, type of synthetic solvent and temperature.

In a preferred embodiment of the invention, the granulation and aging steps take place in the same aging reactor 7. The gel is then introduced from the top of the aging reactor 7, or it is cut into granules, before falling into the aging reactor 7, where hydrolysis and condensation reactions can continue.

After the aging step, the washing step takes place in order to remove impurities and residues of unreacted compounds from the granules. Most of the impurities are made up of catalyst and water. The washing step is important because the presence of water or other components in the drying step can cause degradation of the aerogel 1 network as the mixture may not be fully soluble in supercritical $CO_2$, and therefore a poor quality final product. Washing can be carried out by immersion in a washing solvent solution in a washing reactor 8. The solvent used for the washing step can be ethanol, or another solvent soluble in supercritical $CO_2$ such as acetone, isopropanol or methanol.

The washing step may be an opportunity to introduce a hydrophobing agent, such as hexamethyldisiloxane (HMDSO) or hexamethyldisilazane (HMDZ). This agent interacts with the gel surface in order to make it hydrophobic. This is necessary for some applications so that the aerogel 1 finally produced does not degrade when in contact with air humidity. The hydrophobing agent can also be introduced during or even after the drying stage.

Finally, the solvent present in the granules, for example ethanol, must be removed from the gel to obtain an aerogel 1. Drying by simple evaporation does not produce a good quality aerogel 1, because evaporation can destroy the bonds between molecules within the gel network due to capillary stresses created by a biphasic state. In order to produce a good quality aerogel 1, the process according to the invention comprises a supercritical drying step. This type of drying makes it possible to avoid damaging the aerogel during drying by avoiding a biphasic system and the capillary forces associated with it, which would otherwise cause partial or total destruction of the gel nanostructure.

Several techniques of drying with supercritical $CO_2$ are known to the person skilled in the art. According to a preferred embodiment of the method according to the invention, the following method is proposed:

In the first phase of supercritical drying, the granules are introduced from below into a first fluidized bed tower 9 in which $CO_2$ in supercritical state is also injected from below. $CO_2$ is chosen because its supercritical pressure and temperature are relatively low, and the solvent, for example ethanol, dissolves in the $CO_2$. Using a fluidized bed allows a fast drying, where each particle is directly confronted with the $CO_2$ jet that dissolves the solvent to be evacuated.

In a fluidized bed, the rate of gas injection is regulated. As long as this rate is lower than a fluidization rate, the particles remain settled together. From this rate, and up to a volatilization rate, the particles are raised by the gas jet, mobile, but do not fly away. It is this state that allows the $CO_2$ to come into contact very quickly with each of the particles. Beyond the volatilization rate, the particles are taken away by the gas jet, and are evacuated through the top of the tower.

The volatilization rate is not the same if the particle contains ethanol or supercritical $CO_2$, at the temperature and pressure chosen for the fluidized bed. For the manufacture of a silica aerogel 1, and ethanol as solvent, a pressure of 130 bar and a temperature of 45° C. are suitable. This difference in volatilization rate is used to regulate the rate of the fluidized bed so that particles containing ethanol do not fly away, while those containing only $CO_2$ fly away through the top of the tower, and can be recovered for further processing. The supercritical $CO_2$ is evacuated to a decanter and then to a separator from the solvent. The granules containing ethanol remain in the first fluidized bed 9, and continue to face the $CO_2$ jet, until the ethanol is replaced by $CO_2$, then they fly away.

For the manufacture of a silica aerogel 1, and ethanol as solvent, the fluidized bed can be adjusted to 130 bar and 45° for example. Such conditions allow a favourable rate range for all particle sizes relevant to the production.

At the outlet of the first fluidized bed 9, the supercritical $CO_2$ mixed with ethanol enters a $CO_2$/ethanol separator 10, which allows the pure supercritical $CO_2$ to be re-injected into the fluidized bed 9 and thus, gradually replacing all the solvent with supercritical $CO_2$. Ethanol can be re-injected into the mixing or washing step.

In the second phase of supercritical drying, the granules are injected into a second fluidized bed tower 11, in which nitrogen is injected in supercritical state, or any other inert gas, under the fixed conditions, such as dry air, argon, krypton. The second fluidized bed 11 is set so that just as $CO_2$ has replaced ethanol in the first fluidized bed 9, nitrogen replaces $CO_2$ in the second fluidized bed 11.

Nitrogen can be produced with air in a nitrogen production unit that is part of the method according to the invention; or it can be produced outside the installation.

It is described as incompressible in the scope of this invention because it is much less compressible than $CO_2$.

A decanter 12 can be used at the outlet of the first fluidized bed 9, in order to separate the supercritical $CO_2$, to be returned to the first fluidized bed 9, from the $CO_2$ charged granules, to be returned to the second fluidized bed 11. In a preferred embodiment of the invention, this same decanter 12 is also used to separate supercritical $CO_2$ and supercritical nitrogen at the outlet of the second fluidized bed 11, to be returned respectively to the first fluidized bed 9 and the second fluidized bed 11. Under supercritical $CO_2$ conditions, the density of these two gases is very different and the decantation is instantaneous.

At the outlet of the second fluidized bed 11, the aerogel must be depressurized. Since nitrogen is much less compressible than $CO_2$, depressurization does not damage the aerogel and can be done more quickly than if some $CO_2$ was still present in the granules. The depressurization phase thus takes only a few minutes, while a depressurization of the aerogel still containing $CO_2$ takes several hours, since the depressurization rate must be less than 0.3 bar per minute. The depressurization is done in a decompression device 13. Depressurization can be direct or through a series of depressurization reactors 13.

At each level, nitrogen can be recovered and sent to the second fluidized bed 11. at the outlet of the first level, the residual $CO_2$ can be returned to the decanter 12. When back into atmospheric conditions, nitrogen is separated by known means, and aerogel 1 is recovered. Dusts 14 or too fine granules 15 can be separated and used for specific applications. This leaves granulated aerogel 1 with a granulate size corresponding to the desired one.

The invention claimed is:

1. Installation for the manufacture of a granulated aerogel (1) from a precursor (2), comprising:
    a mixing reactor (5),
    a granulating device (6),
    an aging reactor (7),
    a washing reactor (8),
    a drying device, and
    a decompression device (13),
wherein the aging reactor (7), the washing reactor (8), and the drying device are in communication with each other, and wherein the aging reactor (7), the washing reactor (8), and the drying device are configured to operate at, and maintain from one to another, a pressure higher than that of the critical point of $CO_2$.

2. Installation according to claim 1, wherein the mixing reactor (5) is also configured to maintain a pressure higher than that of the critical point of $CO_2$.

3. Installation according to claim 2, further comprising a first fluidized bed tower (9) configured to allow replacement of a solvent contained in the granules by supercritical CO2.

4. Installation according to claim 3, further comprising a second fluidized bed tower (11) configured to replace the supercritical CO2 contained in the granules with a pressurized inert gas.

5. Installation according to claim 1, wherein the granulating device (6) is located inside the aging reactor (7).

6. Installation according to claim 4, wherein said pressurized inert gas is nitrogen.

7. Installation according to claim 1, wherein the granulating device (6) is configured to form granules from a jet of gelled liquid from the mixing reactor (5).

8. Installation according to claim 3, wherein supercritical CO2 is injected into the bottom of the first fluidized bed tower, solvent-loaded granules enter the bottom of the first fluidized bed tower, and CO2-loaded granules exit from the top of the first fluidized bed tower.

9. Installation according to claim 4, wherein supercritical N2 is injected into the bottom of the second fluidized bed tower, CO2-charged granules enter the bottom of the second fluidized bed tower, and granules charged with pressurized inert gas exit from the top of the second fluidized bed tower.

10. Method of using the installation of claim 1 for manufacturing a granulated aerogel (1) from a precursor (2), comprising the following steps:
- mixing the precursor (2) with a synthetic solvent (3) and a hydrolysis agent, and optionally a catalyst (4), to obtain a gel,
- granulating the resulting product to produce granules,
- maintaining the granules in contact with the synthetic solvent (3) and the hydrolysis agent,
- washing the granules by adding a washing solvent to extract the hydrolysis agent and, if appropriate, the catalyst (4),
- drying the granules to extract the synthetic solvent (3) and/or washing solvent by sending them supercritical $CO_2$ in excess, characterized in that the granulating, maintaining, washing and drying steps are carried out at a pressure higher than that of the critical point of $CO_2$, and these conditions are maintained between these steps.

11. Method according to claim 10, wherein the mixing step is also carried out at a pressure higher than that of the critical point of $CO_2$.

12. Method according to claim 10, wherein, during the drying step, the solvent-loaded granules are subjected to a supercritical $CO_2$ jet so as to put them under fluidized bed conditions, under conditions of temperature and pressure such that the $CO_2$ is supercritical, and that the solvent-loaded particles are heavier than the $CO_2$-loaded particles.

13. Method according to claim 12, wherein the rate of the fluidized bed is adjusted so that the solvent-loaded particles do not fly away and remain confronted with the $CO_2$ jet until the solvent is replaced by $CO_2$, while those containing only $CO_2$ fly away from the top of the tower and can be recovered to be used further in the method.

14. Method according to claim 13, wherein the solvent is ethanol.

15. Method according to claim 14, wherein the synthesis solvent (3) and/or washing solvent is an organic solvent and the drying step is carried out under a pressure of between 100 and 200 bar and a temperature of between 35 and 50° C.

16. Method according to claim 10, comprising, after the drying step, a step of replacing supercritical $CO_2$ with an inert gas and then a decompression step.

17. Method according to claim 16, in which, in the step of replacing supercritical $CO_2$ with an inert gas, the granules charged with supercritical $CO_2$ are subjected to a jet of said inert gas, so as to put them under fluidized bed conditions, under conditions of temperature and pressure such that the $CO_2$ is supercritical, and that the charged particles of supercritical $CO_2$ are heavier than the particles charged with inert gas.

18. Method according to claim 10, wherein the hydrolysis agent is water.

19. Method according to claim 10, wherein the resulting product is granulated by cutting a jet of said gel.

20. Method according to claim 10, wherein the inert gas is nitrogen.

* * * * *